3,309,380
1,2-CYCLOBUTANE DICARBOXIMIDINES, DICAR-
BOXIMINOIMIDES AND PROCESSES FOR THEIR
PRODUCTION
Janice L. Greene, Warrensville Heights, Ohio, assignor to
The Standard Oil Company, Cleveland, Ohio a corpo-
ration of Ohio
No Drawing. Filed Aug. 4, 1964, Ser. No. 387,479
7 Claims. (Cl. 260—326.5)

This invention relates to novel cyclic imides and im-
idines and to the process for preparing them.

The novel compositions embodied herein are those hav-
ing the formula

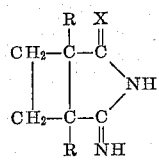

wherein the R groups may be the same or different and
they represent hydrogen, a lower alkyl group or a halogen
and X represents O or NH. Preferred are compositions
of the foregoing formula wherein R is hydrogen or a
methyl radical.

The compounds of the foregoing formula wherein X
is NH are prepared by reacting either a cis- or trans-
1,2-dicyanocyclobutane with an excess of anhydrous am-
monia, preferably in a solution of an alcohol such as
methanol, at a temperature of about 20 to 150° C. A
solid product, a cis-1,2-cyclobutane dicarboximidine, is
obtained.

The compounds of the foregoing formula wherein X
is O are prepared by hydrolyzing the aforementioned cis-
1,2-cyclobutane dicarboximidine. The products are cis-
1,2-cyclobutane dicarboximinoimides. The cis-1,2-cyclo-
butane dicarboximinoimide separates from water solution
on standing and has a melting point of about 236–238°
C. The reaction of 1,2-dicyanocyclobutane to form the
dicarboximidine and the dicarboximinoimide is represent-
ed by the following equation:

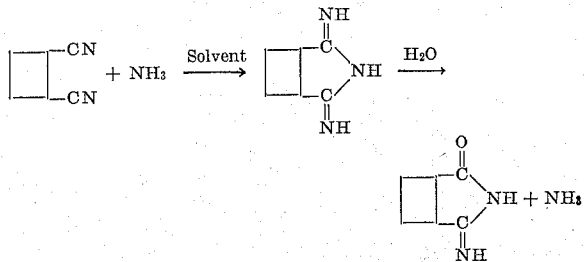

The solvent may be an alcohol such as methanol. The
products were identified by elemental analysis and by in-
frared spectroscopy.

The starting material in the preparation of the novel
products of this invention may be the cis-, trans- or a mix-
ture of the two isomeric forms of the 1,2-dicyanocyclo-
butane. When the trans-isomer is used, it generally takes
longer for the reaction to take place because it is necessary
that isomerization to the cis-dicarboximidine take place.
The use of a solvent for the ammonia is not essential;
however, without a solvent present, the ammonia pressure
becomes quite high at the reaction temperature.

A preferred reaction temperature range for the prepara-
tion of the imidine is from about 25 to 150° C. More
than stoichiometric amounts of ammonia preferably are
employed in this reaction, the upper limit being deter-
mined by the capacity of the pressure vessel in use. The
preferred minimal amount of ammonia is limited by the
stoichiometrical requirement.

An excess amount of water preferably is also employed
in the hydrolysis reaction, the upper limit being deter-
mined by the solubility of the iminoimide in water. The
final product can be recrystallized from dimethyl form-
amide or water.

The 1,2-cyclobutane dicarboximidine is a buff colored
solid which can be recrystallized from methanol or di-
methyl formamide. Recrystallization of the imidine from
dimethyl formamide yields white crystals which darken
and sinter at about 160° C., but do not melt up to 300° C.
The imidine develops a brown coloration in air, but if it is
kept under methanol this coloration does not occur. If
the imidine is exposed to moist air at from about room
temperature to 100° C. for a finite time, it is slowly
hydrolyzed to the iminoimide.

The 1,2-cyclobutane dicarboximinoimide is useful as a
chemical intermediate in the preparation of 1,2-cyclo-
butane dicarboximide, a known compound, disclosed in
the Journal of Organic Chemistry, 22, 1100–1103 (1957).

Both the 1,2-cyclobutane dicarboximidine and 1,2-cyclo-
butane dicarboximinoimide are useful in the preparation
of condensation resins with aldehydes such as formalde-
hyde and acrolein. The resins thus produced are useful
as adhesives and for laminating purposes, coatings, etc.

The products and processes of this invention are further
illustrated in the following examples wherein the amounts
of ingredients are expressed as parts by weight unless
otherwise indicated.

EXAMPLE I (A) In a 2-liter stainless steel autoclave were placed
318 g. (3 moles) of trans-1,2-dicyanocyclobutane and 900
ml. of methanolic ammonia solution containing about 7
moles of ammonia. Anhydrous ammonia gas was charged
to the autoclave at 60 p.s.i.g. for 1 hour, after which the
mixture was heated to 70–75° C. and kept at this tem-
perature for 16 hours. When cool, the solid product, 1,2-
cyclobutane dicarboximidine, was obtained which had the
following analysis:

Calculated: C, 58.57%; H, 7.37%; N, 34.12%. Found:
C, 58.66%; H, 7.63%; N, 33.81%.

(B) An adhesive which adhered substrate materials
such as paper and cardboard together with a bond which
was stronger than the substrate was prepared as follows:
To a 250 ml. flask were added 123 g. (1 mole) of the
cyclobutane imidine described in (A) above and 1.5 moles
of formaldehyde as 120 g. of 37% aqueous formaldehyde
solution. This mixture was allowed to react and it pro-
duced a deep red solution. The solution was refluxed for
four hours and there was then added a trace of p-toluene
sulfonic acid and 48 g. (.87 mole) of acrolein. There
followed an exothermic reaction which produced a dark
red viscous polymer which was found to be an excellent
adhesive for paper-to-paper surfaces.

EXAMPLE II (A) A batch of the 1,2-cyclobutane dicarboximidine
described in Example I(A) was converted to 1,2-cyclo-
butane dicarboximinoimide by dissolving it in a minimal
amount of water. Crystals formed in about 12 hours at
room temperature. The crystals were isolated by filtra-
tion and were washed with cold water to give 347 grams
(93% yield) of 1,2-cyclobutane dicarboximinoimide. The
product had the following elemental analysis:

Calculated: C, 58.0%; H, 6.45%; O, 12.9%; N, 22.4%.
Found: C, 57.98%; H, 6.46%; O, 13.05%; N, 22.35%.

(B) An adhesive was prepared as follows: 124 g. (1
mole) of the iminoimide described in (A) above and 120
g. of 37% aqueous formaldehyde were mixed together in
a 250 ml. flask equipped with reflux condenser. A hard
white mass formed. The mixture was heated at reflux
(98° C.) for about 60 minutes and a liquid layer devel-
oped. Heating was continued for about 4 hours and a clear grey solution developed. To 123 g. (0.5 mole) of the foregoing grey solution were added 42 g. (0.75 mole) of acrolein. The reaction was exothermic yielding a red viscous resin which was found to be an excellent adhesive for paper-to-paper surfaces.

Similar results were obtained when 1,2-dicyano-1,2-dimethyl cyclobutane was substituted for the 1,2-dicyanocyclobutane in Example I(A). Similarly, cis-1,2-dicyanocyclobutane or mixtures of cis- and trans-1,2-dicyanocyclobutane can be used as the starting material in Example I(A).

I claim:

1. A composition having the formula

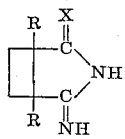

wherein R is a member selected from the group consisting of hydrogen and a methyl radical and X is a member of the group consisting of O and NH.

2. The composition of claim 1 wherein R is hydrogen and X is O.

3. The compostion of claim 1 wherein R is hydrogen and X is NH.

4. The process for preparing a compound having the formula

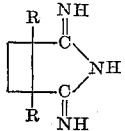

wherein R is a member selected from the group consisting of hydrogen and a methyl radical comprising reacting a compound having the formula

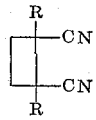

wherein R has the foregoing designation with ammonia at a temperature of from about 25 to 150° C.

5. The process of claim 4 wherein the R groups are hydrogen.

6. The process for preparing a compound having the formula

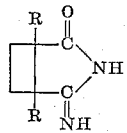

wherein R is a member selected from the group consisting of hydrogen and a methyl radical comprising treating a compound having the formula

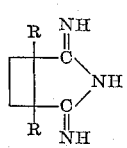

wherein R has the foregoing designation with water at a temperature from about room temperature to about 100° C.

7. The process of claim 6 wherein the R groups are hydrogen.

No references cited.

ALEX MAZEL, *Primary Examiner.*

J. TOVAR, *Assistant Examiner.*